(12) United States Patent
Murakami et al.

(10) Patent No.: US 8,281,203 B2
(45) Date of Patent: Oct. 2, 2012

(54) PCI.EXPRESS COMMUNICATION SYSTEM AND COMMUNICATION METHOD THEREOF

(75) Inventors: Masayuki Murakami, Tokyo (JP); Jun Takehara, Tokyo (JP); Naruhiko Aramaki, Tokyo (JP); Toshikazu Kawamura, Tokyo (JP); Yoichi Takayanagi, Kanagawa-ken (JP); Motohiko Okabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 345 days.

(21) Appl. No.: 12/751,303

(22) Filed: Mar. 31, 2010

(65) Prior Publication Data

US 2010/0251055 A1      Sep. 30, 2010

(30) Foreign Application Priority Data

Mar. 31, 2009   (JP) ................................. P2009-087994

(51) Int. Cl.
*G08C 25/02*   (2006.01)
(52) U.S. Cl. .................. 714/748; 714/749; 714/799
(58) Field of Classification Search ............... 714/748, 714/749, 799, 805
See application file for complete search history.

(56) References Cited

U.S. PATENT DOCUMENTS

| | | | | |
|---|---|---|---|---|
| 7,457,897 B1 * | 11/2008 | Lee et al. | ......................... | 710/74 |
| 7,809,870 B2 * | 10/2010 | McDaniel | ..................... | 710/105 |
| 2008/0072113 A1 * | 3/2008 | Tsang et al. | ................. | 714/748 |
| 2008/0163005 A1 * | 7/2008 | Sonksen et al. | ................. | 714/41 |
| 2009/0006932 A1 | 1/2009 | Biran et al. | | |
| 2009/0106636 A1 * | 4/2009 | Jenkins et al. | ................. | 714/804 |
| 2010/0281195 A1 * | 11/2010 | Daniel et al. | ................... | 710/105 |

OTHER PUBLICATIONS

"PCI Express Base Specification Revision 1.0", "PCI Express Base Specification Revision 1.0—Transaction Layer", XP002495890, Apr. 29, 2002, pp. 43, 62-63.

* cited by examiner

*Primary Examiner* — Yolanda L Wilson
(74) *Attorney, Agent, or Firm* — Oblon, Spivak, McClelland, Maier & Neustadt, L.L.P.

(57) ABSTRACT

When a transaction layer circuit detects an error, error information in respect of transmission data is set in a TLP digest. The method includes: a step in which, at an endpoint (3a) that receives a memory read request transmitted by the root complex 1, if an error is detected during transmission of first data corresponding to the requested TLP, error information is set in the TLP digest and a completion with data attached is returned; a step in which the root complex (1) returns a memory read request based on the error information to the endpoint; a step in which the endpoint returns requested second data; and a step in which the root complex terminates the response after overwriting the error location of the first data that was held, with the second data.

4 Claims, 8 Drawing Sheets

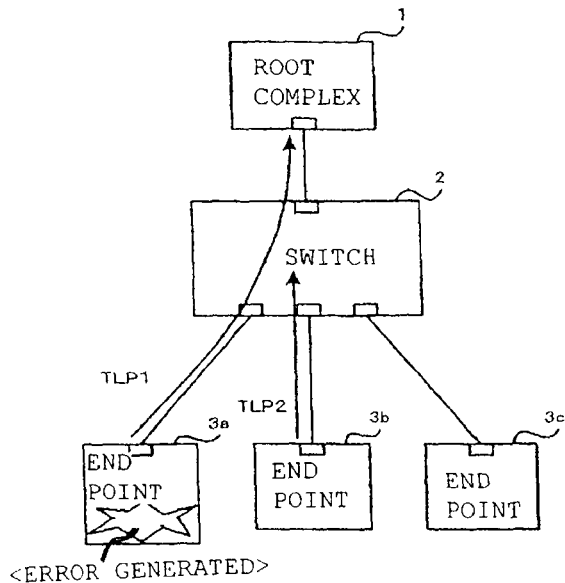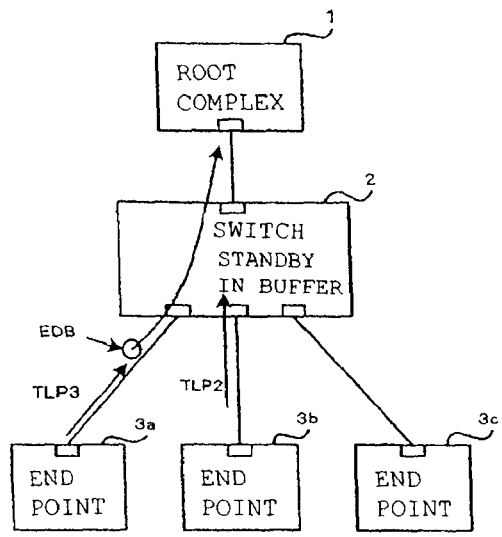
FIG.4A  FIG.4B
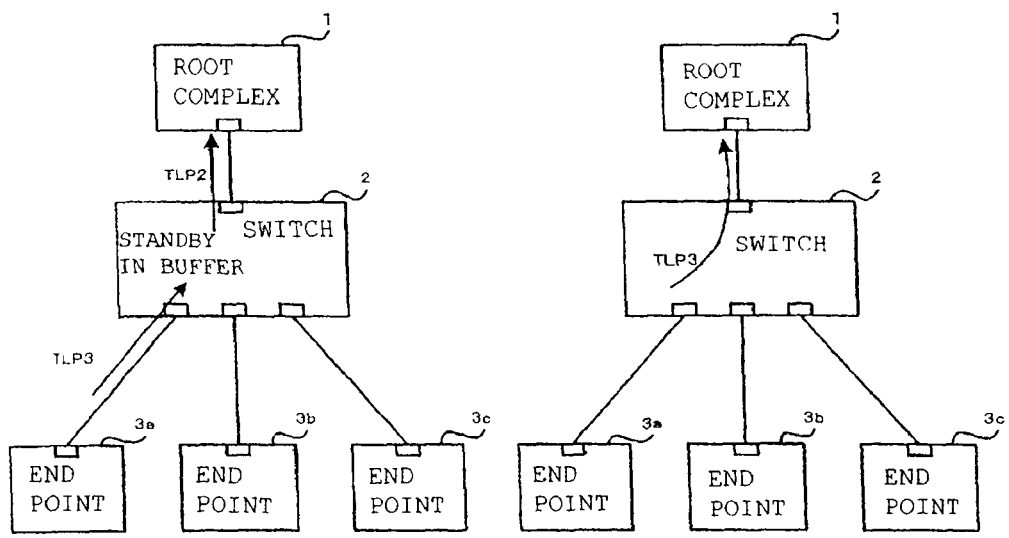
FIG.4C  FIG.4D

PCI.EXPRESS COMMUNICATION SYSTEM AND COMMUNICATION METHOD THEREOF

CROSS-REFERENCE TO RELATED APPLICATION

This application claims benefit of priority from Japanese application number JP 2009-87994 filed Mar. 31, 2009, the entire contents of which are incorporated by reference herein.

BACKGROUND OF THE INVENTION

1. Field of the Invention

The present invention relates to a PCI.Express communication system and communication method thereof and in particular relates to improvements in the transmission protocol of the transaction layer packets (TLP) on error generation.

2. Description of the Related Art

A "PCI.Express" (registered trademark) bus is a type of high-speed serial interface using a point-to-point connection that has been developed in recent years for transmission of data in computer systems and other electronic devices. Such a serial interface bus occupies less area on the circuit board than conventional parallel transmission and so makes possible further miniaturization: its application is being studied in many fields.

The details of this standard are laid down as the PCI.Express base specification by the PCI-SIG (Peripheral Component Interconnect-Special Interest Group), which is the umbrella organization for establishing the PCI standard, and explanations of this standard have also been published. An example of technical documentation available in Japan is "Introduction to PCIe", joint work by Nobutake Arai, Naoshi Satomi, and Akihiro Tanaka (published by Denpa Shinbunsha, 1 Apr. 2007, Chapters 1 to 5 (hereinbelow referred to as non-patent reference 1).

First of all, this PCI.Express communication system (sometimes referred to as PCIe communication system) will be outlined with reference to FIG. 2 to FIG. 3. As shown for example in FIG. 1 a PCI.Express communication system has the devices: a root complex 1, a switch 2 and endpoints 3 (3a, 3b, 3c and 3d).

Also, the root complex 1 and switch 2 respectively have a plurality of ports; the PCI.Express buses 7a to 7e that mutually connect these with the endpoints 3 have a three-layer construction, as shown in FIG. 2.

These layers transmit the data that is exchanged in the form of packets and respectively comprise: a transaction layer 101 that guarantees reliable communication of data in an end-to-end fashion with conventional PCI-compatible services in respect of upper-layer software comprising the drivers and application software of the uppermost layer, a data link layer 102 that guarantees reliable data communication between adjacent components and a physical layer 103 that exchanges communication packets on the physical medium.

In addition, the root complex 1 is located at the uppermost layer of the tree structure of the PCI.Express communication system and is respectively connected through the system bus (not indicated by a reference numeral in the drawing) with a CPU 5 and with a memory 6 through a memory bus (not indicated by a reference numeral in the drawing).

In this layout, in communication between the root complex 1 and the endpoint 3a, the switch 2 constitutes a TLP relay device, and, in communication between the endpoint 3a and the endpoint 3d, the switch 2 and the root complex 1 constitute relay devices.

The connection of the transmission paths between devices of a PCI.Express communication system constructed in this way is a point-to-point connection; in a dual simplex system employing two differential amplifiers in one direction, the link speed is 2.5 G bps, so that a bandwidth of 5 G bps is provided in both directions.

Furthermore, by increasing the number of sets of such bidirectional transmission paths (called lanes) from two to 32, the bus bandwidth can be made scalable, and data transmission can be performed by exchange of packets on these transmission paths.

As shown in FIG. 1, the packets generated in the transaction layer and data link layer are respectively called transaction layer packets (TLP) and data link layer packets (DLLP).

Physical layer packets (PLP) are also generated in the physical layer for link control purposes.

Also, the packets of each layer are exchanged between layers that are connected to the same target via a link and, as shown in FIG. 3, information is added at the beginning and at the end of a packet in the lower protocol layer, before being finally transmitted onto the transmission path (lane). The information at the beginning and end of a packet is deleted in each protocol layer when the packet is received, before the packet is handed over to the upper protocol layer.

In more detail, the TLP that performs end-to-end communication is constituted by a TLP header, data payload, an option TLP digest (called ECRC or end-to-end CRC (Cyclic Redundancy Code)) in the transaction layer; when these packets are received in the data link layer, a sequence number and LCRC are added, then, on reception, deleted after inspection.

DLLP are short packets used for exchange of information such as the response to transmission of a TLP (positive response Ack and negative response Nak) in both directions of a link.

In addition, control characters (STP and END) for detecting the beginning and end of a TLP are added at both ends of each TLP in the physical layer at the receiving end. Also, control characters (STP and END) for detecting the beginning and end of a DLLP are added at both ends of each DLLP.

Next, problems connected with error processing in the transaction layer on the occurrence of an error in the PCI.Express communication system constructed in this way will be described with reference to FIG. 4A to FIG. 4D and FIG. 5.

FIG. 4A to FIG. 4D are views given in explanation of problems that arise when errors are generated during transmission of transmission data from an endpoint 3a in a PCI.Express communication system comprising a root complex 1, switch 2 and endpoints 3a to 3c, and FIG. 5 is a view given in explanation of problems that arise regarding the fault tolerance function when errors are generated.

For example, as in the case of the endpoint 3 shown in FIG. 5, the layout of a PCIe device comprises a PCI.Express communication section 3a1, a local controller 3a2 that receives a request for transmission data from the PCI.Express communication section 3a1 and controls writing of the data to be transmitted to a data buffer (memory) 3a3 that stores the communicated transmission data, and the data buffer 3a3.

In order to establish the integrity of the transmission data transmitted from the PCI.Express device, usually, it is necessary to detect errors at the PCI.Express communication section 3a1 in respect of the data that is read from the data buffer 3a3 by the PCI.Express communication section 3a1. In this error detection, errors in the transmission data caused by for example software errors of the data buffer 3a3, or hardware faults in the upper layer circuitry of the PCI.Express communication section 3a1, such as the local controller 3a2, data buffer 3a3, and PCI.Express communication section 3a1 and the interface between the local controller 3a2 and data buffer 3a3 are detected.

First of all, data transmission in the transaction layer will be described. An EP bit is provided in the TLP header. Regarding the TLP transmission data, if for example the error detection circuit that is provided as part of the circuitry of the transaction layer of the PCI.Express communication section 381, as described above, detects an error, and this area is irrecoverable, the error detection circuit of the transaction layer transmits the TLP packet after setting 1 as the EP bit. By referencing this EP bit, the receiving end can tell that the received data contains an error: end-to-end data integrity can thus be guaranteed.

However, in order for the error detection circuit of the transaction layer at the transmission end to set 1 in the EP bit of the header, all of the transmission data must be temporarily accumulated in the data buffer, so the throughput of the PCI.Express communication system is lowered.

If the bandwidth of the bus of the upper layer circuitry of the PCI.Express described above is higher than the bandwidth of the PCI.Express, it is desirable that the circuitry of the transaction layer should transmit the transmission data that is transferred from the upper layer circuitry from the PCI.Express lane (transmission path) sequentially without temporary accumulation in the data buffer. Such a transmission mode is called "cut through".

Next, a case where delay in error processing in a device adopting such a cut-through transmission mode presents a problem will be described with reference to FIG. 4A to FIG. 4D. FIG. 4A illustrates the condition where the endpoint 3b commences transmission of TLP2 of 1024 double words (hereinbelow abbreviated as DW) addressed to the root complex 1 during transmission from the endpoint 3a of a completion TLP1 with data attached addressed to the root complex 1, when an irrecoverable error is detected in the untransmitted data of TLP1 within the endpoint 3a.

In this case, the endpoint 3a nullifies TLP1 by appending "EDB" (EnD Bad) instead of "END" as the control character at the tail of the TLP, as shown in FIG. 4B and then attempts to transmit to the root complex 1 an error message TLP3 indicating that this error is fatal.

Since TLP2 that was transmitted from the endpoint 3b is in a waiting condition in the buffer in the switch 2 until transmission of TLP1 has been completed, as shown in FIG. 4C, when transmission of TLP1 has been completed, the switch 2 transmits TLP2 to the root complex 1. But since TLP2 is now being transmitted, the error message TLP3 is kept waiting in the buffer of the switch 2.

Then, as shown in FIG. 4D, when transmission of TLP2 has been completed, transmission of TLP2 to the root complex 1 is commenced.

In the case described above, if the number of lanes at 2.5 G bps is 1, the problem arises that the error message TLP3 is delayed by an amount of, at the maximum, about 16 μsec (1024 DW×16 ns/DW). This delay may become even larger in the case of a system in which the switch 2 has a large number of endpoints connected thereto.

Also, there is the problem that, in cases where the endpoint 3c is constituted as a device that operates in a standby fashion with regard to the endpoint 3a, in cases where changeover of the device is triggered by this error message TLP3, such delay in the changeover time represents a period of malfunction of the system.

Next, the case where problems are experienced due to lowering of the fault tolerance function of the system when errors are generated, with reference to FIG. 5.

FIG. 5 is a layout diagram given in explanation of the error recovery operation of the endpoint 3a in the case where the root complex 1 transmits a 1024 DW memory read request TLP31 in respect of the endpoint 3a provided with a local controller 3a2, and the endpoint 3a detects an error in untransmitted data in the data buffer 3a3 during the course of transmission of the completion TLP 32 in respect of this request.

In the PCI.Express device, usually the following recovery operations are performed when cut-through is employed for data transfer of the transaction layer.

(1) On receipt of a memory read request TLP 31, the PCI Express communication section 3a1 of the endpoint 3a requests (s41) 1024 DW of data from the local controller 3a2.

(2) The local controller 3a2 transfers (s43) the data to the data buffer 3a3 and reports completion of data preparation (s42) to the PCI.Express communication section 3a1.

(3) The PCI.Express communication section 3a1 transmits a completion TLP 32 while performing burst read (s44) from the data buffer 3a3.

If, at this point, an error is detected in the data at the data buffer address CF4 h, the tail character "EDB" of the completion TLP 32 is added, so as to nullify the TLP 32 during transmission.

(4) Then, in order to perform error recovery of the data buffer 3a3, the PCI.Express communication section 3a1 again requests data from the local controller 3a2.

The problems associated with the error recovery operation of the data buffer 3a3 of the endpoint 3a will now be described separately for the case of a system designed under the assumption that the error processing response is to deal with a transient software error and for the case of a system designed under the assumption that the error processing response is to deal with an irrecoverable permanent fault.

In the former case, usually, the PCI.Express communication section 3a1 requests 1024 DW of data from the local controller 3a2 in the same way. In this case, there is the problem that, if the buffer address CF4 h is permanently faulty, writing the same data to the same region of the data buffer 3a2 will not result in recovery of the data error of the address CF4 h.

Also, since correct read data cannot be returned to the root complex 1, the PCI.Express communication section 3a1 transmits an error message of an irrecoverable error (Fatal Error) to the root complex 1.

Thus, on receiving this error message, the root complex 1 halts or resets the system.

In the latter case, the method is available of the PCI.Express communication section 3a1 requesting the local controller 3a2 to transmit the data with small data size, so that the completion TLP is transmitted to the root complex 1 by more than one transmission. This has the problem that a long time is required to complete transmission.

Another method is to duplicate the data buffer 3a3, using each data buffer alternately: however, this involves increased memory costs.

Incidentally, regarding this PCI.Express TLP, the technique has been disclosed of entrusting data error detection to LCRC of the data link layer function, utilizing the TLP digest field independently, without employing the ECRC of the transaction layer function. An example is US Patent Application Laid-open No. 2009/0006932 (hereinbelow referred to as patent reference 1).

In the PCI.Express standard, storage of the ECRC in the TLP digest is an option specification for guaranteeing end-to-end data integrity.

However, as stated in patent reference 1, if reliability of the relay device is sufficiently guaranteed and if a data error detection function, such as for example parity in the transmission and reception data buffer, is provided in the transaction layer, guarantee of end-to-end data integrity can be achieved by supplementation by the LCRC, so it may be concluded that the ECRC is unnecessary.

As an embodiment for employing the TLP digest independently in patent reference 1, the TD bit of the TLP header is used to indicate the presence or absence of a TLP digest and, by utilizing a reserve bit of the header, it is possible to indicate whether the TLP digest is being used to store independently-specifiable information or is being used to store the ECRC.

However, if a PCI.Express communication system is constructed in which the reserve bit is utilized with this objective, if, in future, the PCI.Express standard is revised so that a new definition is allocated to this reserve bit, it is possible that compatibility with the future PCI.Express standard will be lost.

It is therefore necessary to ensure that, when the TLP digest is used independently, the specification of independence of the TLP digest can be shared with PCIe devices in the system without needing to employ the reserve bit of the header.

As described above, in regard to TLP transactions based on the conventional PCI.Express specification, there are problems concerning time for fault recovery in the event of an error and concerning fault-tolerance.

SUMMARY OF THE INVENTION

The present invention was made in order to solve the above problems, and constitutes an improvement in the TLP transmission protocol in the event of generation of an error in the PCI.Express communication system, having the object of providing a PCI.Express communication system and method of communication therein, whereby it is possible to shorten the fault recovery time and to achieve improvement in fault tolerance of the PCI.Express communication system in respect of transient software errors or irrecoverable faults in a specified region in the data buffer in an endpoint device or relay device of a PCI.Express communication system.

In order to achieve the above object, a communication method in a PCI.Express communication system according to the present invention is constituted as follows. Specifically, the invention consists in an improvement in the transmission protocol in the event of generation of an error in a PCI.Express communication system, and is characterized in that it comprises:

a step of detecting an error in respect of transmission data in a circuit of the transaction layer and setting error information in a preset format without the addition of an ECRC in the TLP digest of a transaction layer packet (TLP);

a step wherein a transmission device (requester) transmits a memory read request TLP;

a step wherein a receiving device (completer) that receives aforementioned TLP, if an error is detected during transmission of first data corresponding to aforementioned requested TLP, performs return transmission, without nullifying the returned completion TLP, and sets in aforementioned TLP digest as aforementioned error information the following bits: existence of an error, whether this is an address level single error or block level single error, and the error location;

a step wherein aforementioned transmission device, based on aforementioned received error information, makes a memory read request in respect of aforementioned receiving device in which is set the minimum data length of the respective preset error identification level in respect of aforementioned address level single error or aforementioned block level single error in regard to the address where the error is generated;

a step wherein aforementioned receiving device performs return transmission of second requested data in respect of aforementioned memory read request; and a step wherein aforementioned transmission device terminates this transaction on receiving aforementioned requested data and overwriting with the second data aforementioned first data error location that was held; whereby, by means of aforementioned error information, improvement in the fault tolerance on error generation and a shortening of the fault recovery time are made possible.

Furthermore, in order to achieve the above object, a PCI.Express communication system according to the present invention is constructed as follows. Specifically, a PCI.Express communication system with an improved transmission protocol in the event of generation of an error in the PCI.Express communication system is characterized in that, in a device of aforementioned PCI.Express communication system that exchanges TLP, when an error is detected in circuitry of the transaction layer, preset transmission data error information is set in the TLP digest of a transaction layer packet (TLP), without adding an ECRC;

a transmission device (requester) transmits a memory read request TLP;

a receiving device (completer) that receives aforementioned TLP, if an error is detected during transmission of first data corresponding to aforementioned requested TLP, performs return transmission, without nullifying the returned completion TLP, and sets in aforementioned TLP digest as aforementioned error information the following bits: existence of an error, whether this is an address level single error or block level single error, and the error location;

aforementioned transmission device, based on aforementioned received error information, makes a memory read request in respect of aforementioned receiving device in which is set the minimum data length of the respective preset error identification level in respect of aforementioned address level single error or aforementioned block level single error in regard to the address where the error is generated;

aforementioned receiving device performs return transmission of second requested data in respect of aforementioned memory read request; and aforementioned transmission device terminates this transaction on receiving aforementioned requested data after overwriting with the second data aforementioned first data error location that was held; whereby, by means of aforementioned error information, improvement in the fault tolerance on error generation and a shortening of the fault recovery time are made possible.

According to the present invention, an improvement in fault tolerance of a PCI.Express communication system can be achieved in respect of irrecoverable faults of a specified region in the data buffer in a relay device or end device of the PCI.Express communication system, or in respect of transient software errors, and a PCI.Express communication system and communication method therefore can be provided in which the fault recovery time can be shortened.

BRIEF DESCRIPTION OF THE DRAWINGS

FIG. 4A to FIG. 4D are views given in explanation of problems of the conventional PCI.Express communication system;

DETAILED DESCRIPTION OF THE PREFERRED EMBODIMENTS

Embodiments of the present invention are described below with reference to the drawings.

[Embodiment 1]

Figure 6:
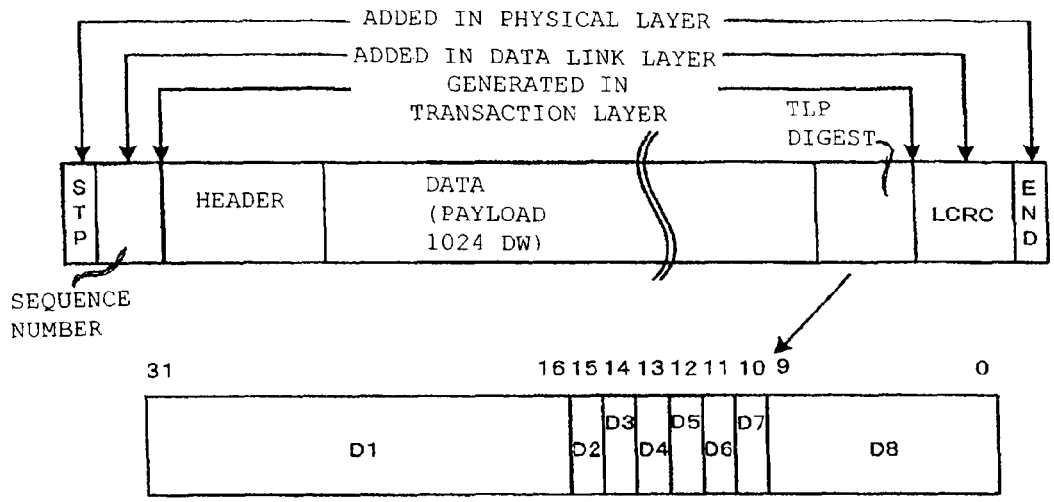
FIG. 6 is a layout diagram of the format of a PCI.Express communication system TLP according to the present invention.
Figure 7:
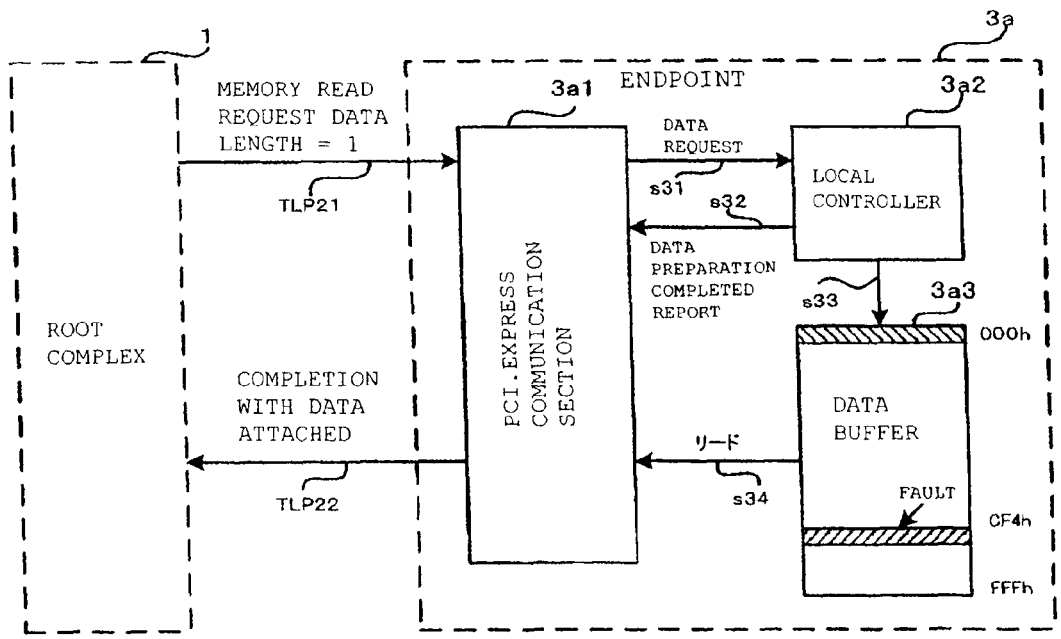
FIG. 7 is a view given in explanation of a PCI.Express communication system according to the present invention.

FIG. 6 shows an example of the format of a TLP digest according to the present invention and FIG. 7 shows a layout diagram given in explanation of an example of the operation of the PCI.Express communication system employing this TLP digest.

The various parts of this embodiment 1 are given the same reference numbers as corresponding parts in the PCI.Express communication system of the prior art example shown in FIG. 1 to FIG. 5, and further description thereof is dispensed with.

Figure 1:
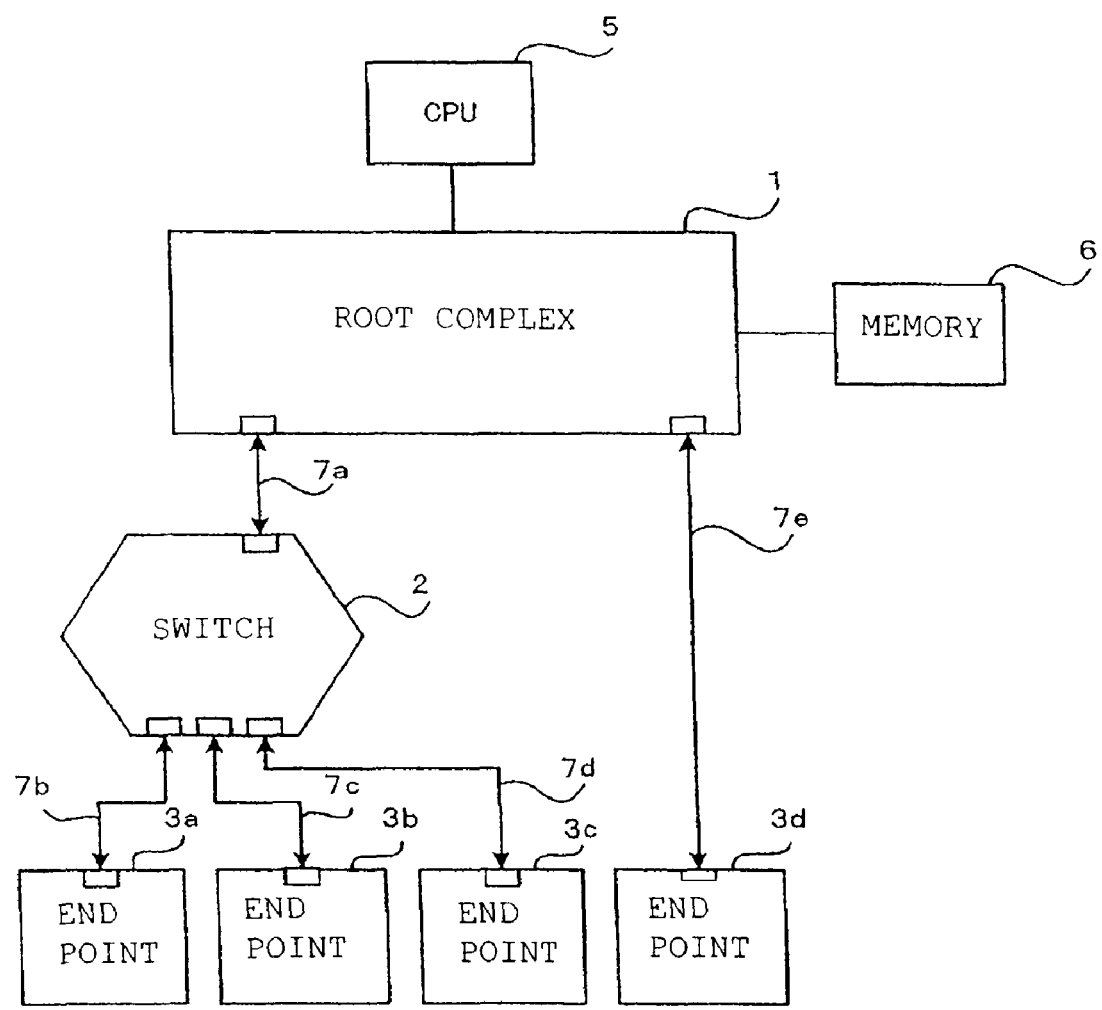
FIG. 1 is a layout diagram of a conventional PCI.Express communication system.
Figure 2:
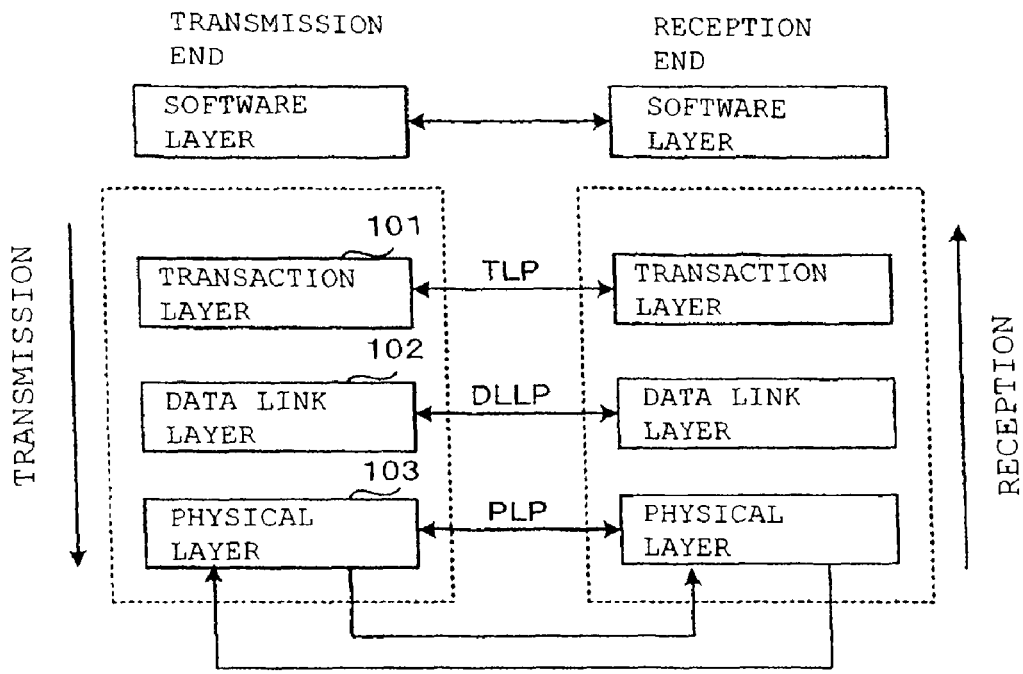
FIG. 2 is a view given in explanation of a conventional PCI.Express construction.
Figure 3:
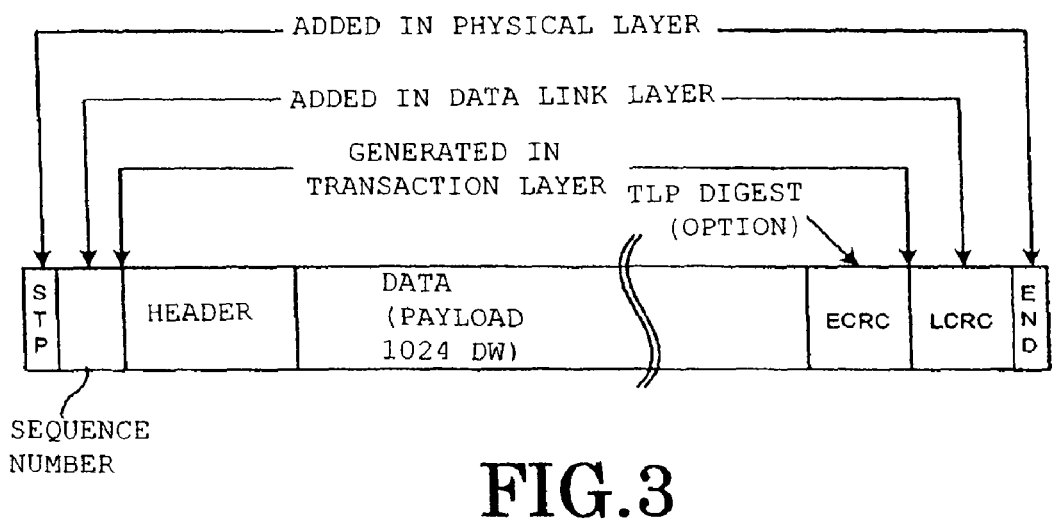
FIG. 3 is a view given in explanation of the conventional TLP format.
Figure 5:
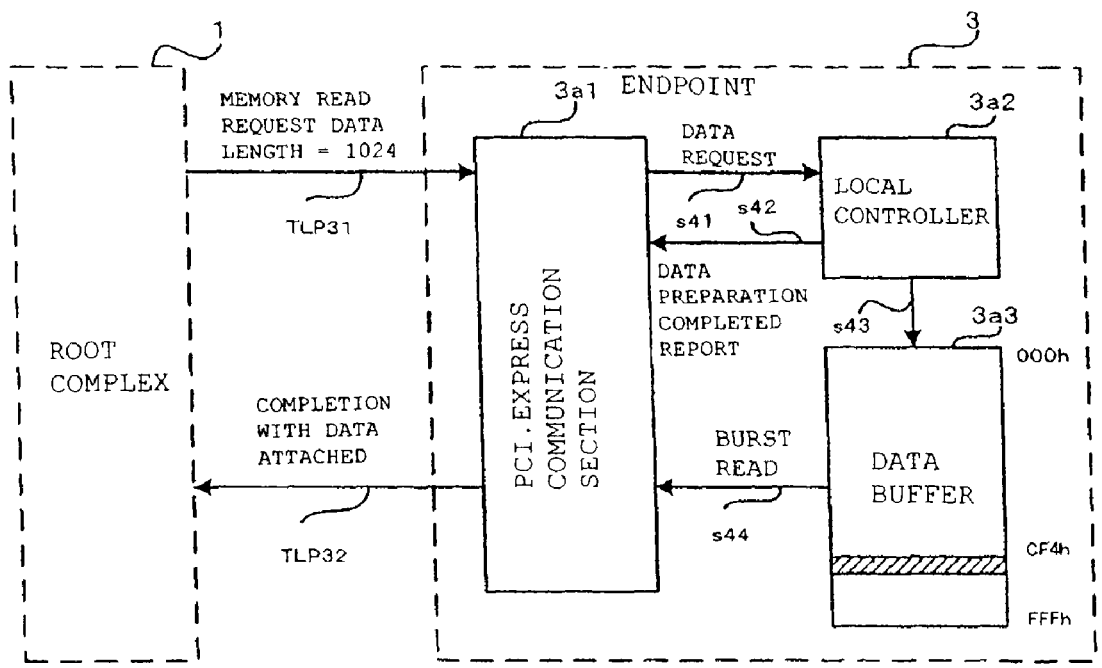
FIG. 5 is a view given in explanation of the problems of a conventional PCI.Express communication system.

The points of difference between the embodiment of the present invention of FIG. 6 and the prior art PCI.Express communication system example described in FIG. 5 are that, whereas, in the conventional PCI.Express communication system in which a cut-through transmission system is adopted, when an error is detected in the untransmitted data during transmission of a TLP at the endpoint 3$a$, typically the method is adopted that the ECRC is inverted and the packet is nullified (nullified TLP) by changing the control character at the end of the TLP from "END" to "EDB", according to the present invention, by storing preset error information in the TLP digest, the fault tolerance of the PCI.Express communication system is improved and the time for fault recovery is shortened in regard to software errors or irrecoverable faults at a specified location generated in the local controller 3$a$2 constituting the upper layer circuit of the PCI.Express communication section 3$a$1, the data buffer 3$a$3 and the data buffer 3$a$3 of the transaction layer or transient errors generated in the interface between these circuits and the PCI.Express communication section 3$a$1.

First of all, the structure of a transaction layer packet according to the present invention and an example of the setting of the format of a 32-bit TLP digest appended to the packet tail will be described with reference to FIG. 6.

The error detection redundancy code D1 is used to guarantee end-to-end data integrity and is set in a region constituted by the upper 16 bits, namely, bits 16 to 31. This region is provided in order to guarantee end-to-end data integrity if the reliability of the end-to-end relay device is unclear or insufficient. This corresponds to the role of the ECRC in PCI.Express, and, apart from a 16-bit CRC, may be set as for example a 16-bit SUM.

The parity D2 that is set as the bit 15 is a parity bit for guaranteeing the data in bits 0 to 14, to be later described. The TLP digest field is a field for further improving data reliability, although data errors can be detected by the LCRC.

The error existence D3 that is set as bit 14 is a bit that indicates whether or not an error is contained in the TLP data that is transmitted (1: an error is present; 0: no error).

Also, the necessity of error recovery D4 that is set as bit 13 is a bit that instructs the requesting end as to whether or not error data recovery processing is required, in cases where a completion with attached data is received.

(For example: 1 means that the requester issues a memory read request of the minimum data length in respect of the address region including the error data, or solely in respect of the peripheral region of the address, or issues a memory read request of the same data length as the address as on the previous occasion; and 0 means that the requester completes the transaction by performing the usual processing of the read data, irrespective of whether or not an error is present.)

This is a bit that gives instructions to the completer to perform error data processing when a memory write request or message has been received.

(For example, 1 means that the completer discards the error data.

(However, whether all of the data to be discarded, or only the error data is to be discarded and the remaining data is to be held is determined by the system.)

0 means that the computer performs the ordinary processing on the write data.)

Next, the error recovery possibility D5 that is set as bit 12 is a bit that indicates whether or not an error generated at the transmission end is recoverable. (For example, 1 means that correct data can be regenerated by a function at the transmission end i.e. the error is recoverable. 0 means that correct data cannot be regenerated by a function at the transmission end i.e. the error is irrecoverable.)

Also, the address level single error D6 that is set as bit 11 is a bit indicating whether or not a data error of 1 DW only is included in the TLP data.

(For example, 1 means a single error and 0 means multiple errors.)

Likewise, the block level single error D7 that is set as the bit 10 is a bit that indicates whether or not a data error is included in only one block defined by an address boundary that was set beforehand in system design in the TLP data.

(For example 1 means a single error and 0 means multiple errors)

In addition, the error location D8 that is set in the bits 0 to 9 constitutes a region in which the location where an error is initially detected is set and consists in bits indicating how many DW there are before the error is reached, counting from the head end of the TLP data payload.

The term "error information" will be used as a general designation of setting information relating to errors described in the format of the TLP digest shown in FIG. 6.

Next, the transaction operation of a PCIe communication system set up in accordance with the format of such a TLP digest will be described with reference to FIG. 7.

FIG. 7 is a layout diagram given in explanation of the operation when error recovery is performed by the endpoint 3$a$ in the case where the root complex 1 issues a 1024 DW memory read request (TLP) in respect of the endpoint 3$a$, which is provided with a local controller 3$a$2, and the endpoint 3$a$ detects an error in untransmitted data in the data buffer 3$a$3 during transmission of a completion with attached data, with reference to FIG. 5.

According to the present invention, the error recovery operation is performed as follows. First of all, in the same way as in FIG. 5, (1) On receipt of a memory read request TLP 31, the PCI Express communication section 3a1 of the endpoint 3a requests 1024 DW of data from the local controller 3a2.

(2) The local controller 3a2 transfers the data to the data buffer 3a3 and reports completion of data preparation to the PCI.Express communication section Sa1.

(3) The PCI.Express communication section 3a1 transmits a completion TLP 32 with data attached while performing burst read (s44) from the data buffer 3a3.

At this point, error is detected in the data at the data buffer address CF4 h, but no "EDB" is attached to the tail of the completion TLP and the TLP that is being transmitted is not nullified.

The error recovery operation of the data buffer 3a3 by the endpoint 3a is then as follows: —

(4) The error information that is detected from the data that is being transmitted is set in the format of the TLP digest, as described with reference to FIG. 6; if this error information that has thus been set represents for example a single error, a TLP (completion TLP 32 with data attached) that states the address of the error location is transmitted from the endpoint.

(5) From FIG. 7, the root complex 1 issues a memory read request solely in respect of the address of the location where the error was generated, whilst the received data is still held, and, since the error is a single error, sets (TLP 21) 1 in the data length field of the TLP header, as the data length of the TLP at this point.

(6) The PCI.Express communication section 3a1 of the endpoint 3a makes a request in respect of the local controller 3a2 for 1 DW of data, in respect of the address that was requested.

(7) The local controller 1 prepares (s33) 1 DW of data at the head of the data buffer 3a3 and reports (s32) completion of data preparation to the PCI.Express communication section 3a1.

(8) The PCI.Express communication section 3a1 then reads (s34) the data of the head address of the data buffer 3a3, and transmits a TLP (TLP 22) of this data to the root complex 1.

(9) The root complex 1 thereupon, on receiving this TLP, overwrites with this data the error location of the data that was held, and thereby terminates this transaction.

In such error processing, if the head address of the data buffer 3a3 into which the requested 1 DW data is written should be faulty, it will not be possible to transmit correct data; however, this eventuality can be avoided by instructing the local controller 1 to perform writing to some other, preset region.

By error processing in accordance with such error information set in the TLP digest, fault tolerance can be implemented not only for transient software errors but also for permanent faults of specified regions.

In addition, transactions can be completed promptly, since error recovery is performed by issuing a memory read request solely in respect of the specified region of the error location.

Consequently, since it becomes possible to recover from errors promptly not only in the case of single errors generated in the data buffer 3a3 but also in the case of transient errors generated between the data buffer and the local controller, real-time characteristics of the PCI.Express communication system can be secured in respect of errors of the upper layer of PCI.Express circuitry.

Figure 8:
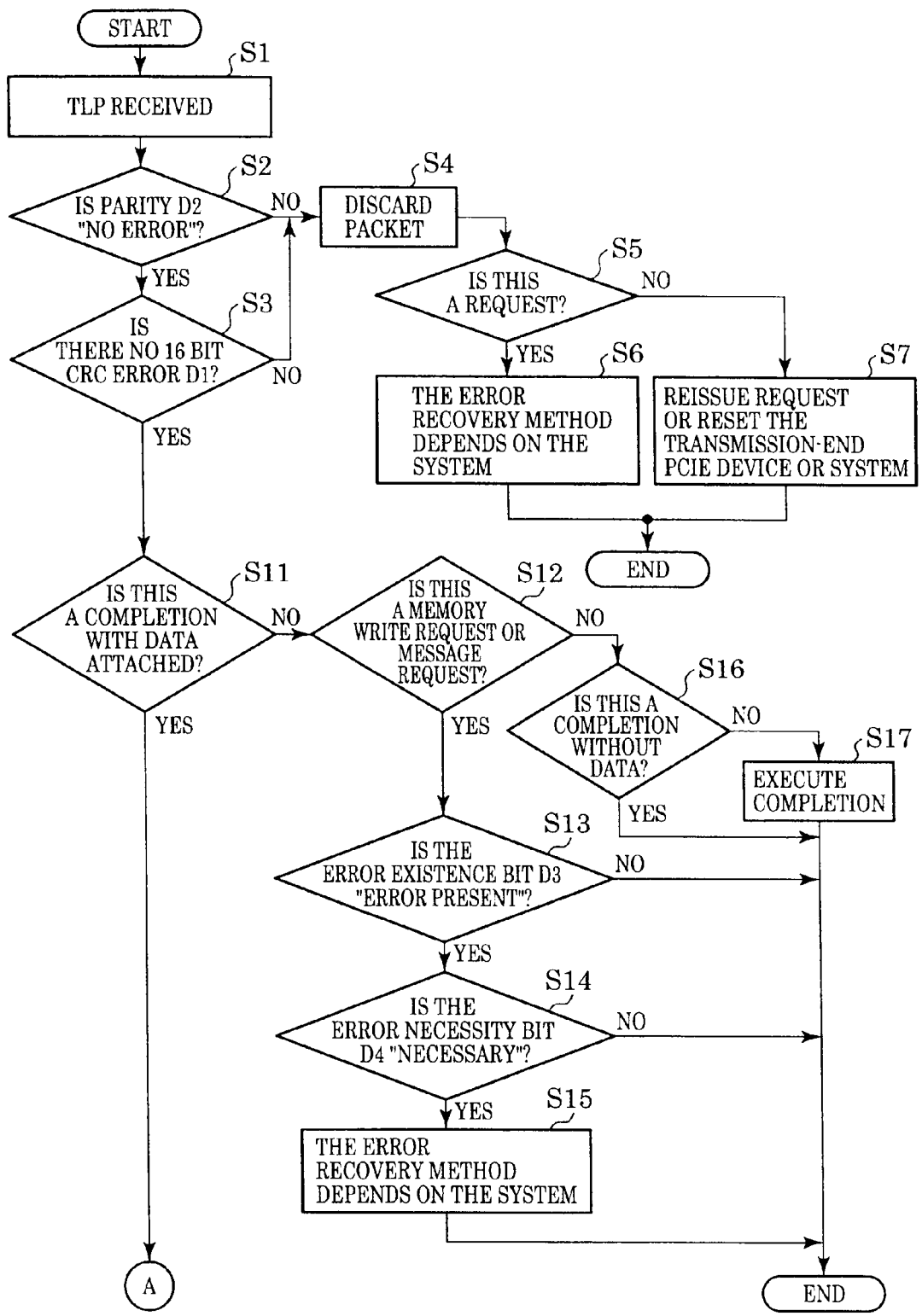
FIG. 8 is a flow chart given in explanation of the communication operation of a TLP digest according to the present invention.
Figure 9:
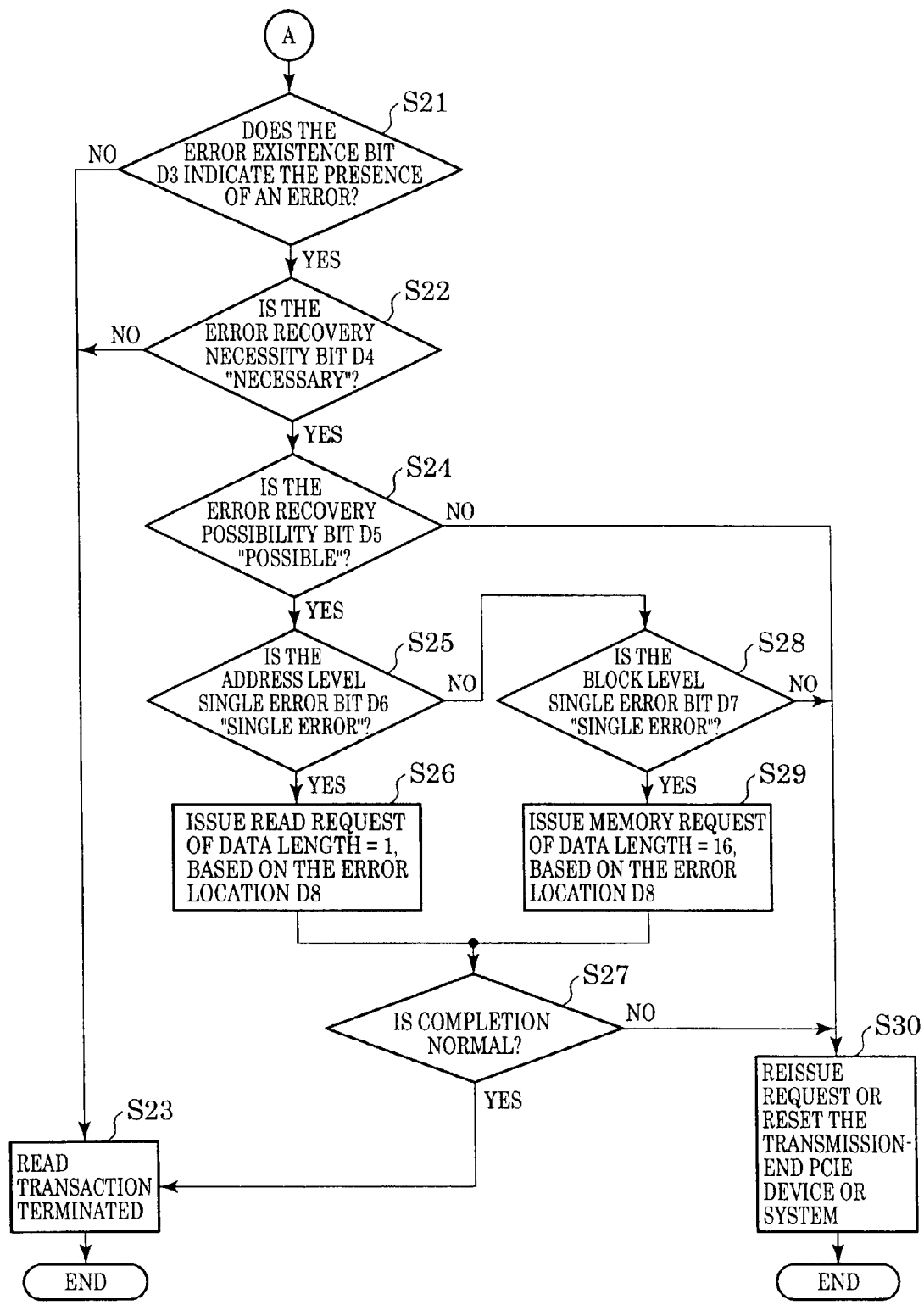
FIG. 9 is a flow chart given in explanation of the communication operation of a TLP digest according to the present invention.

Next, the details of TLP reception processing operation in accordance with a TLP digest in which error information is set according to the present invention will be described with reference to FIG. 8 and FIG. 9.

Whether no error is present in the received TLP is evaluated (s1 to s3) by referring to the parity D2 and error detection redundancy code D1.

If an error is present in either of these, the packet is discarded (s4); if the type of this TLP is a request, processing is performed by the pre-set system recovery method (s5, s6).

Otherwise, i.e. in the case where the packet is a completion, the previous request is reissued or the transmission-end device or system is reset (s7).

In the case (s11) in which there is no error in the received TLP and the type thereof is other than a completion with data attached, or in the case (s12) where the type is a memory write request or message, and furthermore, if "error present" is indicated at D3 of this TLP or "error recovery necessary" is indicated at D4, the predetermined error recovery processing is executed (s15). Otherwise ("no error" indicated at D3 or "no error recovery" indicated at D4), this response is terminated.

If the type of this TLP is not any of: a completion with data attached, a memory write request, or a message request, if this TLP is a no-data completion, this response is terminated (s6). Otherwise, i.e. in the case of a request other than a memory write request or message request, completion is executed (s17).

Next, in the case where this TLP is a completion with data attached, the processing operation of the device that receives this will be described with reference to FIG. 9.

If, in respect of the requested data, "no error" is indicated at D3 (s21) or the "error recovery necessity" indicated at D4 (s22) is "not required", the read transaction is terminated (s23).

However, if, in respect of the data, "error present" is indicated at D3 (s21) or "error recovery necessary" is indicated at D4 (s22), the possibility of error recovery indicated at D5 is determined (s24). If the error recovery possibility indicated at D5 is "impossible", the address level single error indicated at D6 is referenced, and if, as a result, it is found that a single error (s25) is in question, a memory read request of data length 1 DW is transmitted to the address of the error location D8 (s26).

If completion in respect of this request is returned normally, this read transaction is terminated (s27, s23).

If, on referring to the address level "single error" D6, the result is a "block level single error" (s28), a memory read request of data length n DW with respect to the head address of the n DW (i.e. n times DW) address boundary, based on this error location D8, is transmitted (s29). If completion is returned normally in respect of this request, this read transaction is terminated (s27, s23).

If the error recovery possibility D5 is negative or if the error is an address level single error but not a block level single error (s28: No), either the same request as previously is reissued, or the transmitting-end PCI.Express device, or the entire system, is reset.

[Embodiment 2]

Next, a method of communication in a PCI.Express communication system wherein PCI.Express devices (hereinbelow called customized devices) in which the TLP digest is independently employed, as described in embodiment 1, and conventional PCI.Express devices (hereinbelow called conventional devices or universal devices) are both present will be described.

If all the PCI.Express devices in the PCI.Express communication system are designed with independence, all of the devices may suitably be designed so as to be capable of setting/detection of error information as described in embodiment 1 in the TLP digest.

However, even in the case of PCI.Express communication systems for industrial purposes, in which reliability is required, the case may be considered in which the construction of the PCI.Express communication system that is adopted includes both conventional devices and customized devices designed with independence as illustrated in embodiment 1.

Figure 10:
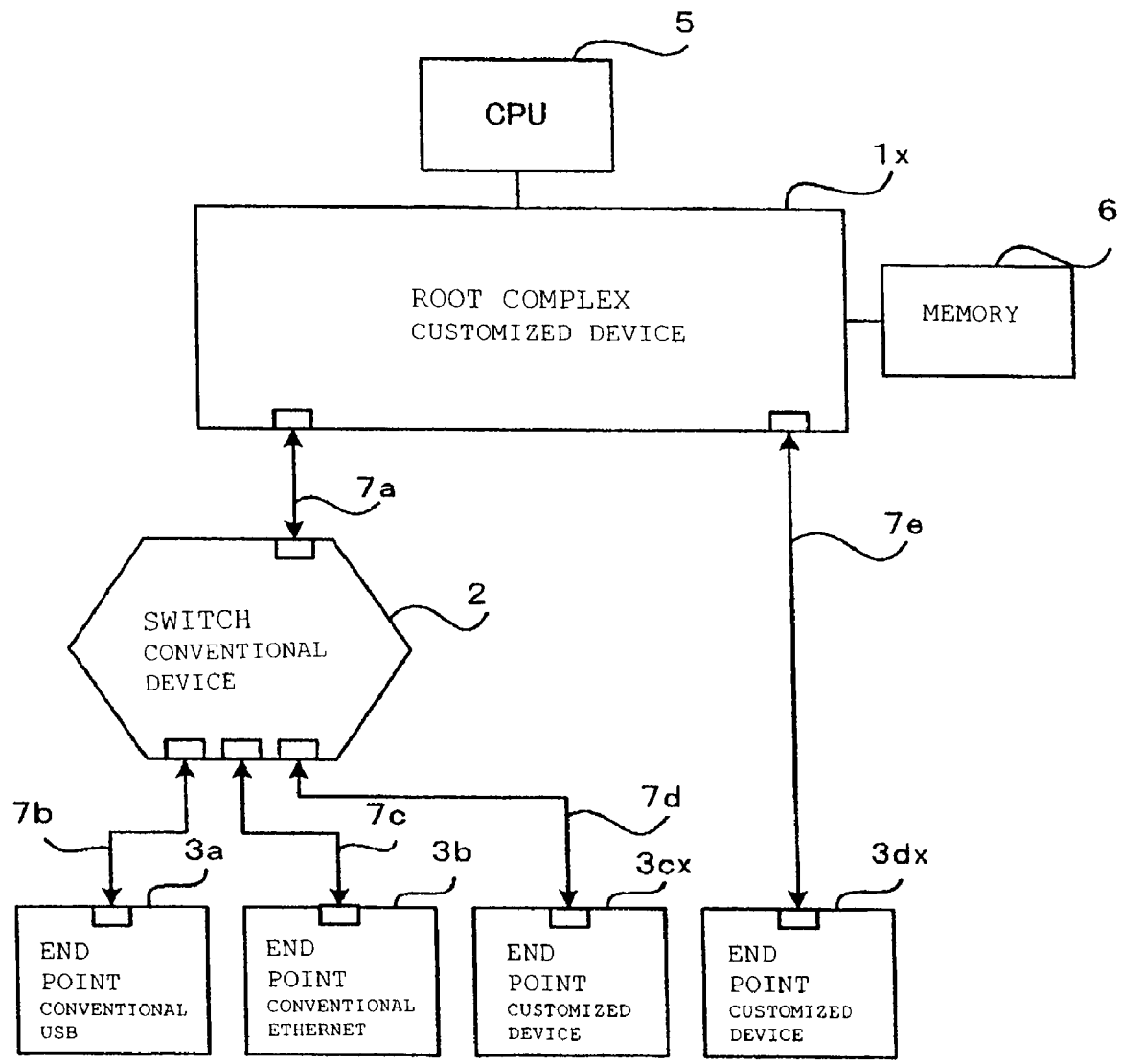
FIG. 10 is an embodiment of a PCI.Express communication system employing a TLP digest according to the present invention.

For example, as shown in FIG. 10, the transaction layer can be designed with independence, the root complex 1x being a customized device for purposes of achieving for example higher reliability of the CPU 5 or the interface with the memory 6 or for duplicated control of the CPU 5 and the endpoints 3cx, 3dx being customized devices such as for example real-time Ethernet (registered trademark) devices.

In contrast, the endpoints 3a, 3b are for example conventional Ethernet (registered trademark) or conventional USB devices: since these are COTS (commercial off-the-shelf products), the circuitry of the transaction layer cannot be modified.

Where these endpoints 3cx, 3dx that are customized devices require control communication such as for example real-time Ethernet (registered trademark), the transaction layer is designed with independence, but, in the case of the conventional Ethernet (registered trademark) 3b or conventional USB 3a ports, it is expensive to make these devices customized devices, so, usually, it is not possible to modify the PCI.Express communication sections of such conventional devices.

In the case of a construction in which both conventional and customized devices are present, as described above, it is necessary for the root complex 1x to be able to identify easily which PCI.Express devices support an independently-specifiable TLP digest, as illustrated in embodiment 1.

Whereas in the disclosure of patent reference 1, by utilizing the reserve bit of the TLP header, the type of the TLP digest is identified, for each TLP, as being of a type in which only the ECRC is transmitted or of a type in which independently-specifiable transmission can be performed, the present embodiment 2 differs in that all customized devices can be identified en masse on configuration.

A method of device identification in a system construction in which both conventional and customized devices are present will be described below with reference to FIG. 10.

On system initialization, the root complex 1x of FIG. 10 transmits in a broadcast fashion a message that is independently specifiable by the vendor. The vendor-specified message is determined by the PCI.Express standard and the message code is 0111 1111 (Vendor_defined Type 1). The fourth DW of the message header is a vendor-writable field and is used to store a predetermined code indicating that the TLP digest is independently specifiable.

When the customized device endpoints 3cx and 3dx receive this message, they return the vendor-specifiable message described above to the root complex 1x.

The conventional device endpoints 3a and 3b are unable to interpret the content of this vendor-specifiable message, and so discard this message.

The root complex 1x stores all of the IDs (bus number, device number, function number) of the endpoints that respond and, after initialization, processes the TLP digests in an independently-specifiable fashion in respect of requests or completions that correspond to such IDs; in the case of requests or completions that do not correspond with these IDs, the root complex either does not employ the TLP digest, or performs processing using the ECRC.

With regard to message requests of the broadcast type, customized devices either process the TLP digest in accordance with the ECRC, or nullify the TLP digest by setting the TD bit of the header of this message to 0.

With the method described above, it is easily possible to identify whether the devices constituted on system initialization are conventional or customized.

The present invention is not restricted in any way to the embodiments described above and can be implemented with various modifications within the scope of the gist of the invention: regarding the error information that is set in the TLP digest, the region in respect of which retransmission is required may be altered depending on for example the structure of the buffer memory or the data structure.

What is claimed is:

1. A communication method in a PCI.Express communication system, being an improvement in a transmission protocol in an event of generation of an error in said PCI.Express communication system, comprising:

detecting an error in respect of transmission data in a circuit of a transaction layer and setting error information in a preset format without an addition of an ECRC in a TLP digest of a transaction layer packet;

transmitting a memory read request TLP by a transmission device;

performing return transmission, without nullifying a returned completion TLP, and setting in said TLP digest as said error information following bits: existence of an error, whether this is an address level single error or block level single error, and an error location, by a receiving device that receives said TLP, if an error is detected during transmission of first data corresponding to said requested TLP;

making a memory read request in respect of said receiving device in which is set a minimum data length of a respective preset error identification level in respect of said address level single error or said block level single error in regard to said address where said error is generated by said transmission device, based on said received error information;

performing a return transmission of second requested data in respect of said memory read request by said receiving device; and completing a transaction on receiving said requested data and overwriting with said second data a first data error location that was held, by said transmission device.

2. The communication method in a PCI.Express communication system according to claim 1, wherein said error information that is set in said TLP digest comprises:

a redundant code bit of said TLP digest, for error detection, in which is set a data integrity of a TLP, by fault detection of an internal circuitry in a device in question;

an error existence bit in which is set whether or not an error is contained in data of said TLP;

an error recovery necessity bit that specifies whether or not recovery of said data in question by said transmission device is required, when said receiving device transmits a completion with data attached, and that specifies a necessity of error data processing by said receiving device when said transmission device transmits a memory write request or message;

an error recovery possibility bit that indicates whether or not recovery of a detected error is possible at said receiving device end;

an address level single error bit that indicates whether or not an error in said data of said TLP is of data length only 1 DW;

a block level single error bit that indicates whether or not a data error is present in only one block in said data of said TLP defined by a preset address boundary;

an error location bit that indicates a location where an error is generated in said data of said TLP; and a parity bit that indicates a parity of a plurality of bits of said TLP digest, excluding said redundant code bit for error detection.

3. A PCI.Express communication system with an improved transmission protocol in an event of generation of an error in said PCI.Express communication system, comprising:

a device of said PCI.Express communication system that exchanges TLP, when an error is detected in circuitry of a transaction layer, preset transmission data error information is set in a TLP digest of a transaction layer packet, without adding an ECRC;

a transmission device transmitting a memory read request TLP;

a receiving device that receives said TLP, if an error is detected during transmission of first data corresponding to said requested TLP, performs a return transmission, without nullifying a returned completion TLP, and sets in said TLP digest as said error information following bits: existence of an error, whether this is an address level single error or block level single error, and an error location;

wherein said transmission device, based on said received error information, makes a memory read request in respect of said receiving device in which is set a minimum data length of a respective preset error identification level in respect of said address level single error or said block level single error in regard to an address where said error is generated;

said receiving device performs a return transmission of second requested data in respect of said memory read request; and said transmission device terminates said transaction on receiving said requested data after overwriting with said second data a first data error location that was held.

4. The PCI.Express communication system according to claim 3, wherein said error information that is set in said TLP digest comprises:

a redundant code bit of said TLP digest, for error detection, in which is set a data integrity of a TLP, by fault detection of an internal circuitry of a device in question;

an error existence bit in which is set whether or not an error is contained in said data of said TLP;

an error recovery necessity bit that specifies whether or not recovery of said data in question by said transmission device is required, when said receiving device transmits a completion with data attached, and that specifies a necessity of error data processing by said receiving device when said transmission device transmits a memory write request or message;

an error recovery possibility bit that indicates whether or not recovery of a detected error is possible at said receiving device end;

an address level single error bit that indicates whether or not an error in said data of said TLP is of data length only 1 DW;

a block level single error bit that indicates whether or not a data error is present in only one block in said data of said TLP defined by a preset address boundary;

an error location bit that indicates a location where an error is generated in said data of said TLP; and a parity bit that indicates a parity of a plurality of bits of said TLP digest, excluding said redundant code bit for error detection.

* * * * *